United States Patent [19]
Bazarian et al.

[11] Patent Number: 5,308,239
[45] Date of Patent: May 3, 1994

[54] METHOD FOR REDUCING NOX PRODUCTION DURING AIR-FUEL COMBUSTION PROCESSES

[75] Inventors: Edward R. Bazarian, Allentown; James F. Heffron, Orwigsburg; Charles E. Baukal, Jr., Harleysville, all of Pa.

[73] Assignee: Air Products and Chemicals, Inc., Allentown, Pa.

[21] Appl. No.: 831,149

[22] Filed: Feb. 4, 1992

[51] Int. Cl.$^5$ .............................................. F23M 3/04
[52] U.S. Cl. ..................... 431/10; 431/160; 431/18.7
[58] Field of Search ................ 431/8, 9, 10, 159, 181, 431/187, 184, 186, 183

[56] References Cited

U.S. PATENT DOCUMENTS

| | | | |
|---|---|---|---|
| 3,976,420 | 8/1976 | Takahashi et al. | 431/10 |
| 4,395,223 | 7/1983 | Okigami et al. | 431/10 |
| 4,797,087 | 1/1989 | Gitman | 431/187 |

FOREIGN PATENT DOCUMENTS

| | | | |
|---|---|---|---|
| 2146113 | 4/1985 | United Kingdom | 431/10 |
| 10864 | 7/1991 | World Int. Prop. O. | 431/10 |

Primary Examiner—James C. Yeung
Attorney, Agent, or Firm—James C. Simmons; William F. Marsh

[57] ABSTRACT

Oxy-fuel combustion combined with air-fuel combustion to increase productivity of the combustion process and reduce nitrogen oxides in the products of combustion by maintaining fuel rich oxy-fuel combustion while combusting the air-fuel as close as possible at stoichiometric conditions.

10 Claims, 5 Drawing Sheets

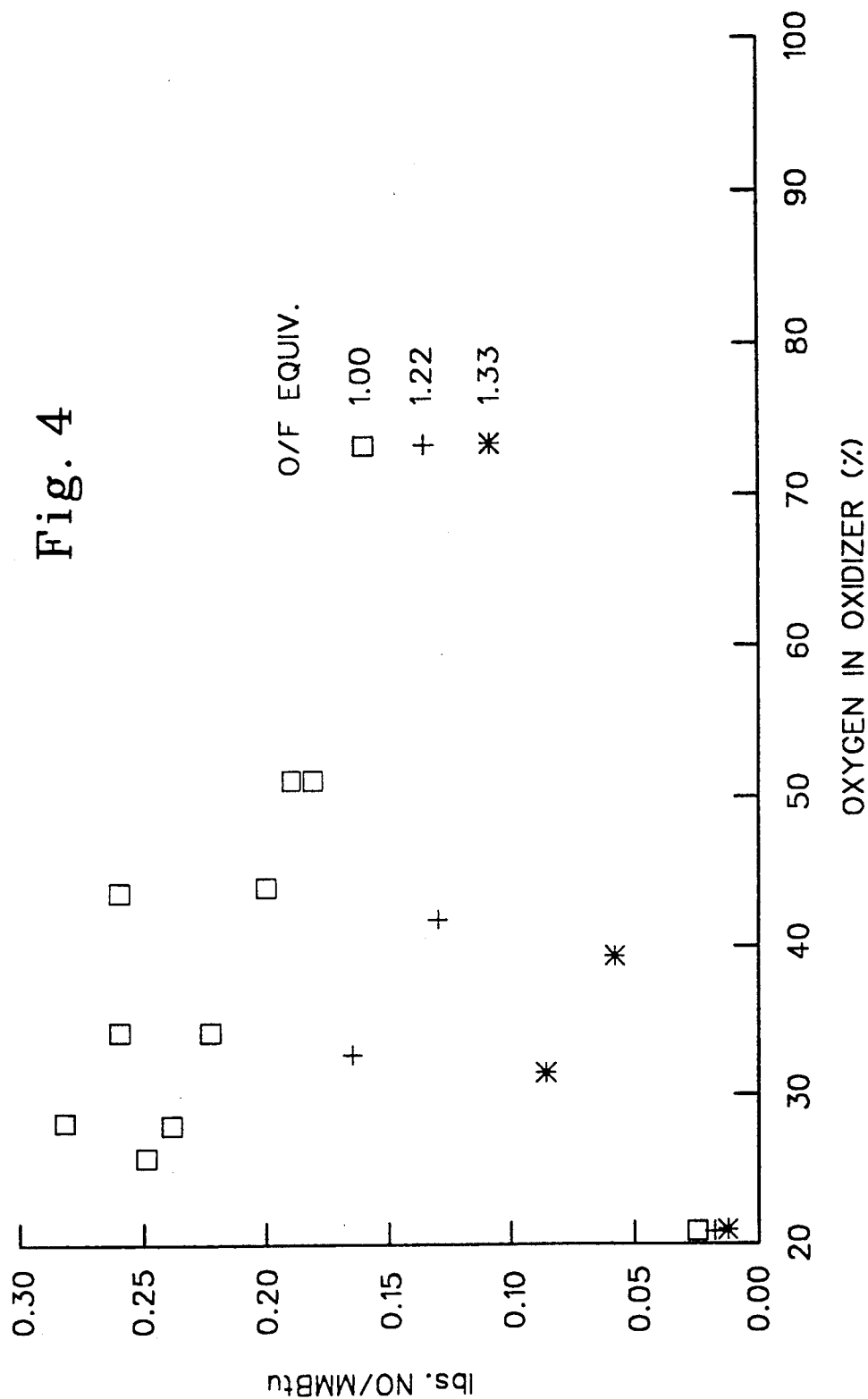

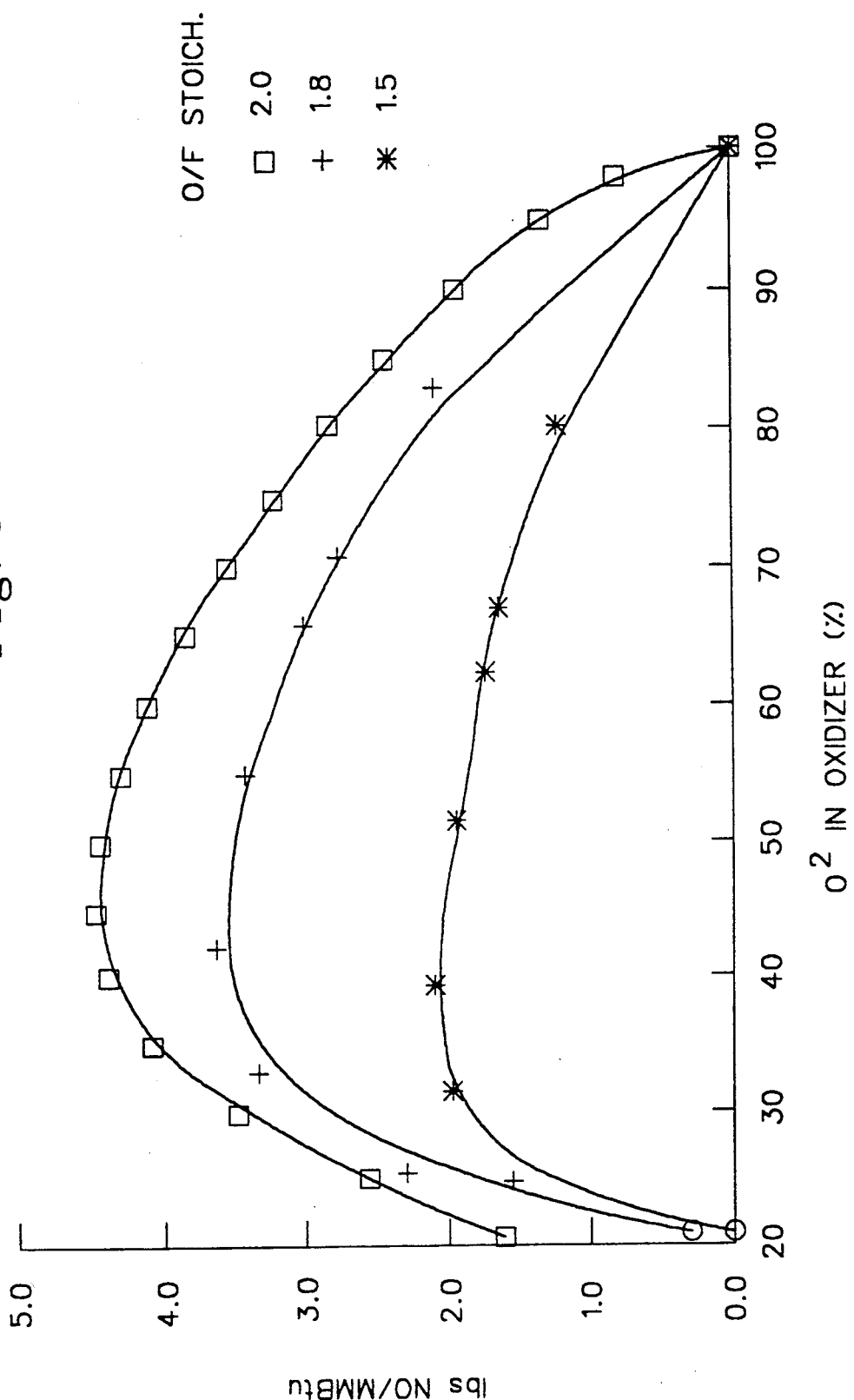

METHOD FOR REDUCING NOX PRODUCTION DURING AIR-FUEL COMBUSTION PROCESSES

FIELD OF THE INVENTION

The present invention pertains to air-fuel combustion processes.

BACKGROUND OF THE INVENTION

The vast majority of combustion processes use air as an oxidizer in combustion with a fuel such as natural gas, fuel oil, propane, waste oils, other hydrocarbons and the like. It is also known that the performance of many air-fuel combustion processes can be improved by enriching the combustion air with oxygen. Enrichment of the combustion air increases both the flame temperature and the thermal efficiency while the flue gas volume decreases as the oxygen concentration in the air or oxidizer increases. The cost of high purity oxygen for enrichment can be offset by gains in productivity from the enhanced combustion. Low level enrichment of up to 35% total oxygen content in the oxidizer can generally be retrofitted to existing air-fuel systems with few modifications.

Recently, the environmental impact of combustion processes has received a great deal of attention. It has been shown that the nitrogen oxides, known as NOx, are detrimental to the environment by producing smog, acid rain, and ozone in the lower atmosphere, the latter being a cause of global warming. In the United States the new Clean Air Act signifies the commitment of the Federal Government toward controlling pollution. The new regulations have spurred an increased interest in controlling NOx formation as a result of combusting air-fuel mixtures.

It is also known that low level oxygen enrichment in combustion can cause a dramatic increase in NOx emissions. In industrial combustion processes, over 90% of the NOx emissions are in the form of a nitric oxide or NO. It has also been shown that at high levels of oxygen enrichment, e.g. above 90% total oxygen content in the oxidizer, less NOx is produced than using air for the same firing rate. However, high levels of oxygen enrichment can be uneconomical in a given process and in fact may produce materials problems also.

In the past, two strategies have been used to reduce NOx emissions. The first is to remove the NOx from the exhaust gases before they exit into the atmosphere. Post-treatment of the exhaust gases from the combustion process can be carried out by selective catalytic or non-catalytic reduction and various combinations of oxidation, absorption and reduction processes to scrub out the NOx. These processes generally involve high cost and a need to shut down the combustion process in the event of failure with the post-treatment equipment. The second method or strategy is to minimize NOx formation in the first place by modifying the combustion process in some manner. Examples of this second strategy include water or steam injection into the flame, reduced excess air in the combustion process and so-called low NOx burner designs. These technologies provide the user with a penalty in reduced thermal efficiency or only minimal NOx reductions.

SUMMARY OF THE INVENTION

The present invention provides a method of utilizing oxy-fuel combustion in combination with an existing air-fuel system to increase productivity while minimizing NOx formation. The oxy-fuel combustion is shielded by the air-fuel combustion and the oxy-fuel combustion is controlled so that the combustion takes place in a fuel-rich state.

BRIEF DESCRIPTION OF THE DRAWING

FIG. 4 is a plot of pounds of NO per million BTU produced against oxygen concentration in the oxidizer for the test results of FIG. 3.

FIG. 5 is a plot of pounds NO per million BTU produced against total oxygen in the oxidizer for three different oxygen-fuel ratios as predicted assuming the fuel and oxidizer are perfectly mixed and react adiabatically.

DETAILED DESCRIPTION OF THE PRESENT INVENTION

Figure 1:
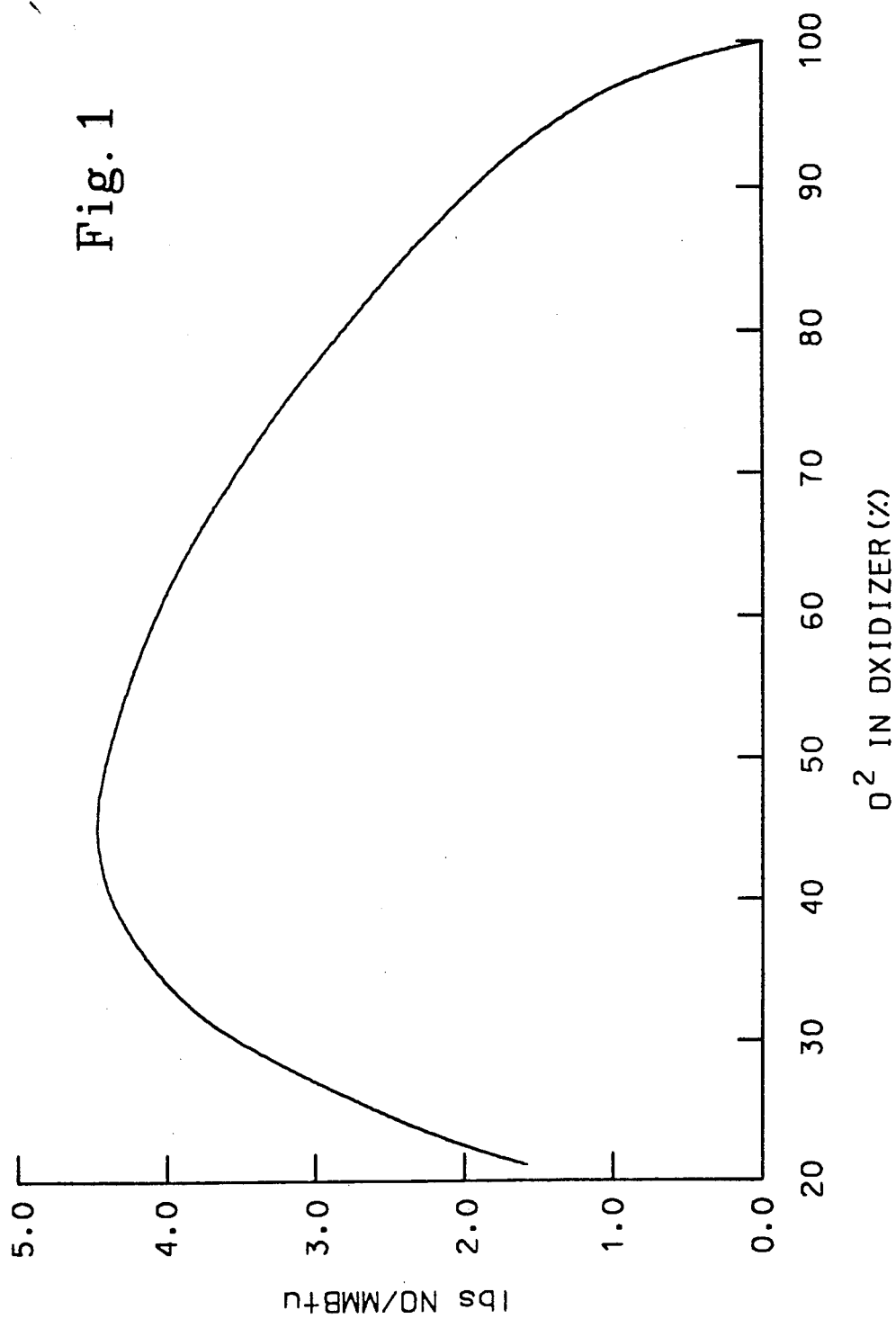
FIG. 1 is a plot of pounds of NO produced per million BTUs against the percent oxygen in the oxidizer of a typical combustion process.
Figure 2:
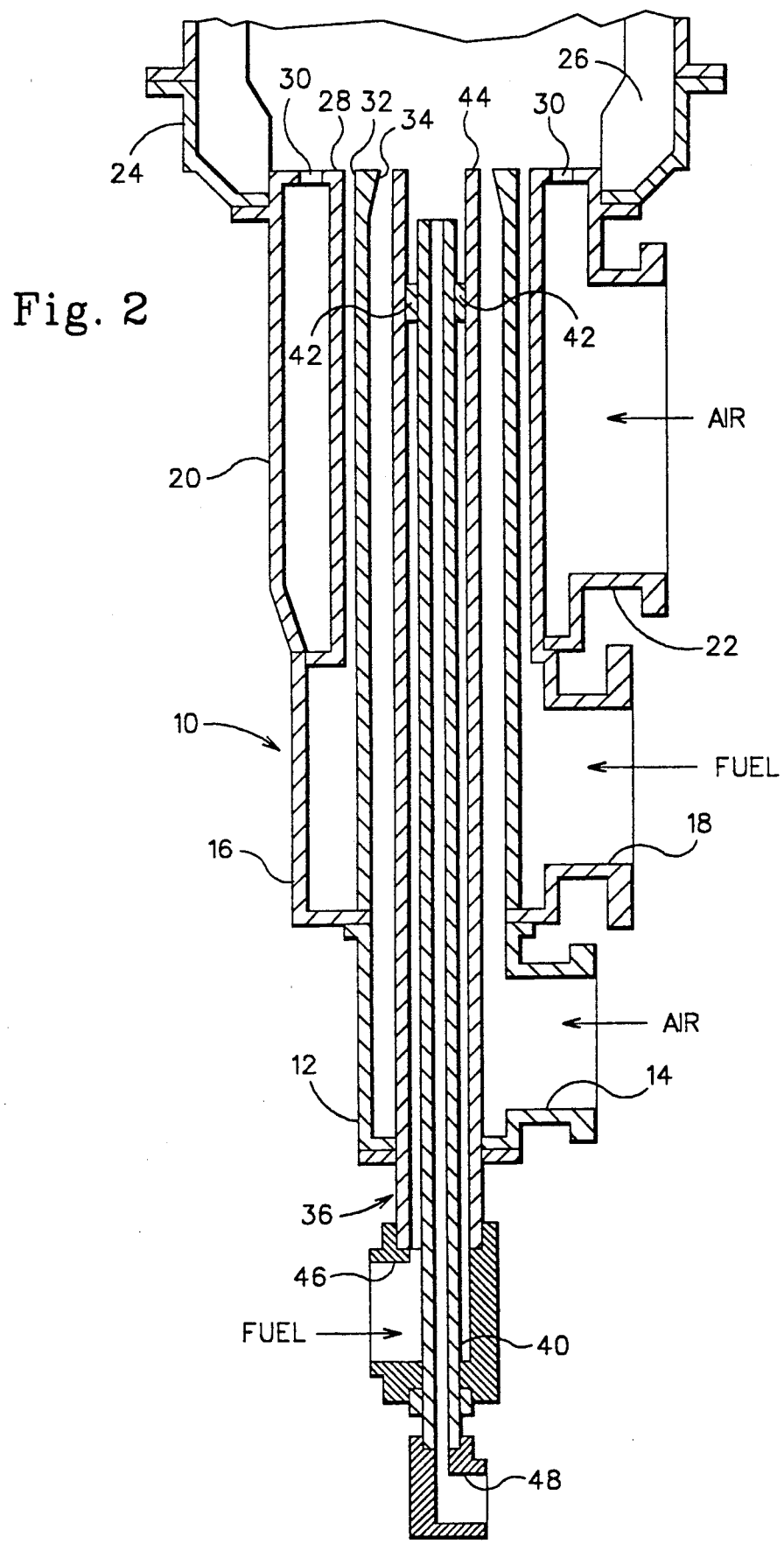
FIG. 2 is a longitudinal schematic of an apparatus used to verify the process of the present invention.

The problem as stated above with utilizing oxygen enrichment in combustion is that there is a dramatic increase in NOx emissions. In most industrial combustion processes, over 90% of the NOx emissions are in the form of nitric oxide or NO. FIG. 1 shows the equilibrium predictions for NO for an adiabatic, stoichiometric, methane flame as a function of the oxygen concentration in an oxygen-nitrogen oxidizer, e.g. air. The units for nitric oxide or NO are pounds of NO per million BTUs gross firing rate of the fuel. FIG. 1 shows that NO dramatically increases at low levels of oxygen enrichment which trend has been verified experimentally in numerous tests conducted with enrichment of conventional air-fuel burners. Economics, process considerations and materials limitations more often than not make high levels of oxygen enrichment impractical, even though the high levels of enrichment produced less NOx than air for the same firing rate. In accord with the present invention, the process is most easily achieved by retrofitting an oxygen-fuel burner to an existing air-fuel system to increase productivity while minimizing NOx formation. As shown in FIG. 2, a dual fuel air-fuel burner shown generally as 10 includes a first atomizing air passage 12 in the form of a tubular shape with an air inlet fitting 14 disposed concentrically around the first air tube is a fuel tube 16 having a fuel inlet 18 the fuel tube 16 being surrounded on its forward end with a concentric tube which defines a main combustion air inlet tube 20 with a combustion air inlet passage 22. On the forward end of the burner 10 is a burner mounting flange 24 containing a burner tile 26, the burner tile being fabricated from a ceramic material. The forward end of the main combustion air passage 20 terminates in a plate 28 with a plurality of air passages 30 disposed on axes parallel to longitudinal axis of the fuel passage 32 which is in the form of an annulus disposed around the annular termination of the atomizing air passage 34. Disposed concentrically within air passage 12 is an oxy-fuel burner shown generally as 36. Oxy-fuel burner 36 is a concentric tube burner having an outer tube 38 concentrically disposed around an inner tube 40. The inner tube is spaced from the outer tube by a plurality of radially spaced spacers 42 proximate the front end 44 of the burner. The oxy-fuel burner is adapted so that in one embodiment, fuel is admitted through a fitting 46 and is conducted around the outside of the inner tube 40 and exits the front end of the burner 44. Oxygen is conducted down the center or oxidizer tube 40 by means of an oxidizer inlet fitting 48. Oxidizer tube 40 terminates at a location inwardly of the discharge end of the burner 36 so that proper combustion of the oxy-fuel mixture can take place. Alternatively, the oxygen and fuel passages can be reversed. Concentric oxy-fuel burners are well known in the art, one being a K-Tech burner offered for sale by Air Products and Chemicals, Inc. of Allentown, Pa.

In operation the burner 10 is set up so that natural gas is delivered through fitting 18 and primary combustion air delivered through fitting 22 so that combustion takes place forward of the front end of the oxy-fuel burner 36. The oxy-fuel burner is used to produce an oxy-fuel flame or combustion at the forward end 44 of the burner 36 by introducing oxygen into fitting 46 and fuel such as natural gas into fitting 48. In order to minimize the production of NOx, the oxy-fuel burner is operated in a fuel-rich condition. Fuel-rich is taken to mean an equivalence ratio between 1.2 and 1.35 preferably at about 1.33 when the ratio of the oxygen in the oxy-fuel burner to the fuel is divided into the ratio of oxygen and the oxy-fuel burner as if the oxy-fuel burner were operating under conditions of stoichiometry. Furthermore, operation is conducted so that the oxy-fuel flame is shrouded by the air-fuel flame. In the device of FIG. 2 this is easily accomplished by placing the oxy-fuel burner inside of the air-fuel burner so that the oxy-fuel combustion takes place inside of an envelope of the air-fuel combustion. Other configurations can be utilized wherein the oxy-fuel flame is separate from the air-fuel flame except that the two flames are merged after creation.

By way of explanation it is well known that running a flame fuel-rich reduces NOx production because of the reduction in flame temperature and the reduced amount of available oxygen radicals. Due to the fact that there is not enough oxygen to fully oxidize the fuel, the maximum flame temperature is never achieved. In addition, thermodynamically the oxygen preferentially combines with carbon and hydrogen before combining with nitrogen to form nitrogen oxides. However, unburned hydrocarbon emissions increase under fuel-rich conditions which conditions are environmentally unacceptable and the overall thermal efficiency of the combustion process is reduced.

Figure 3:
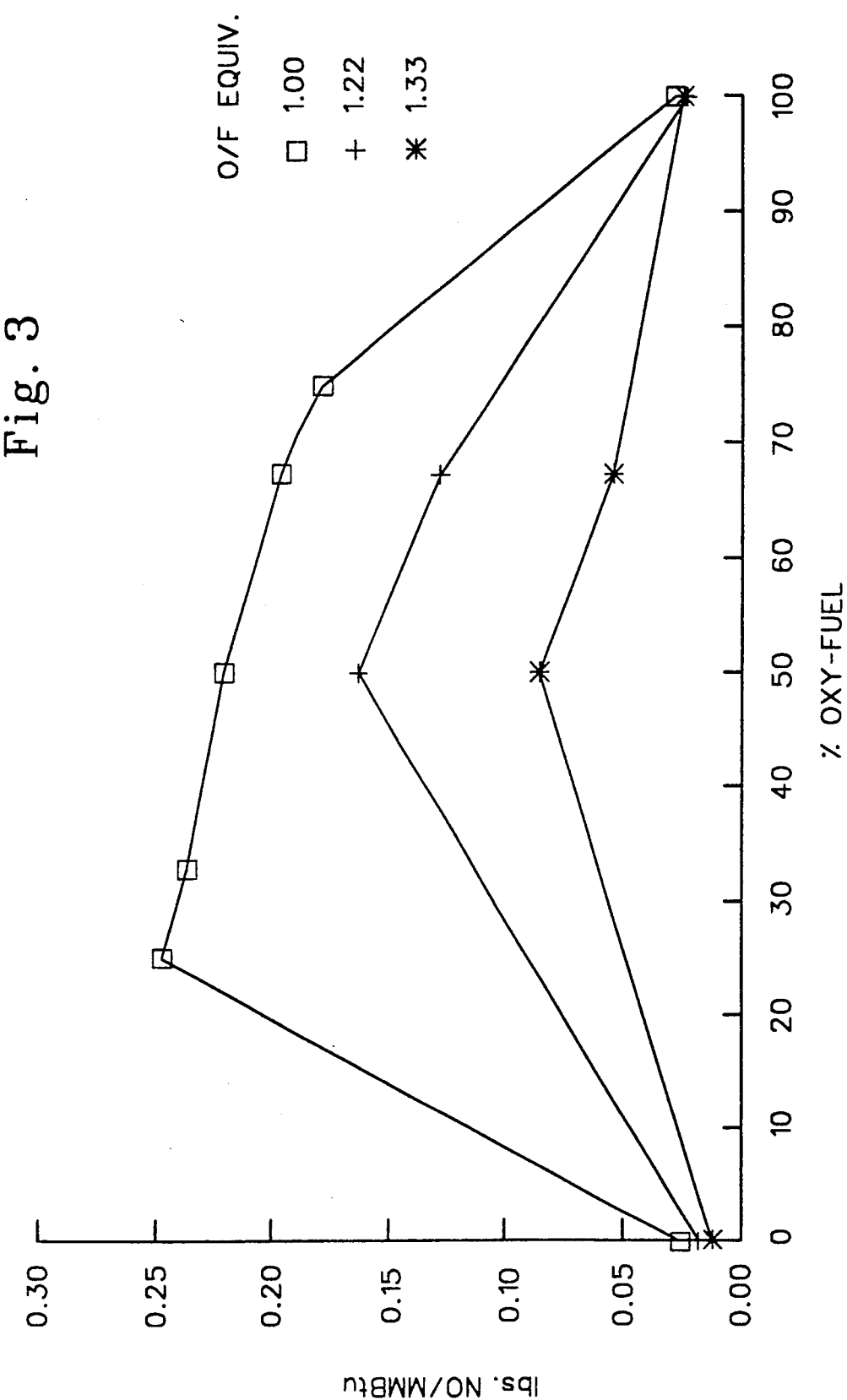
FIG. 3 is a plot of pounds of NO per million BTU produced against the percentage of the total combustion process that was from a source of oxy-fuel combustion.

An actual test with the set up of FIG. 2, high purity oxygen (e.g. 99% $O_2$) was used in the oxy-fuel burner and natural gas containing better than 95% methane and 0.32% nitrogen by volume was used for the fuel. As shown in FIG. 3, the X axis shows how much of the total firing rate was created by using an oxy-fuel combustion supplement. For example, at 50% oxy-fuel, half the total firing rate was oxy-fuel and half was air-fuel. The equivalence ratio of the oxy-fuel burner was varied from 1.00 to 1.33 where 1.0 is the stoichiometric ratio for methane. In FIG. 3 where no oxy-fuel (0% oxy-fuel) was used, the air-fuel equivalence ratio was varied. These curves show a dramatic decline in NO as the oxy-fuel flame became more fuel-rich. The curves also show that there will be peaks in the middle ranges of oxy-fuel supplementation, however, the precise peaks were not determined during these experimental runs.

FIG. 4 shows the same data that was plotted in FIG. 3 except that the data is presented in the terms of overall oxygen concentration in the oxidizer so the test can be evaluated as if the oxygen was premixed with the air. For example, if the total firing rate is split evenly between the air-fuel and the oxygen-fuel burners and both burners are at stoichiometric conditions, the equivalent oxygen concentration for oxygen premixed with air is 34.6%. This curve is instructive because it can be readily compared to the theoretical NOx curves shown in FIG. 5. The curves of FIG. 5 are the equilibrium predictions assuming fuel and oxidizer are perfectly mixed. The curves of FIG. 5 shows that NOx is predicted to increase as the oxygen enrichment level increases toward 40%. However, the experimental data of FIG. 3 shows the NOx declines as enrichment goes from 30–40%. It is believed that this is due to separate flame zones that are created by inserting an oxy-fuel burner into an air-fuel burner. A conventional oxy-fuel burner would have a high flame temperature.

The curves shown in the drawing are based on gross firing rate and do not include the effect of increased efficiency with more oxygen. This effectively lowers NOx even further if it is measured on a basis of (pounds) lbs NO/net MMBTu.

The air-fuel burner tested had unusually low NOx because of its poor mixing characteristics. Most air-fuel burners are >0.1 lb NO/MMBtu which means the invention may be even better for other burners.

By running the oxy-fuel burner fuel-rich the flame temperature is dramatically reduced. In addition, the natural gas in the outer annulus of the oxy-fuel burner acts as a shroud which delays the inner high purity oxygen from reaching the nitrogen in the air-fuel burner. Since the flame is fuel-rich, most of the oxygen oxidizes the hydrocarbon fuel before it mixes with the air-fuel stream. It is believed that the combination of lower flame temperature, reducing conditions in the oxy-fuel flame temperature and shrouding of the inner high purity oxygen from the nitrogen in the air-fuel flame all contribute to the unexpected reduction of NOx in the exhaust gases. From the experimental data one could predict that the preferred conditions would occur when at least two thirds of the total firing rate is accomplished by virtue of using the oxy-fuel burner. In view of the experimental data and the conclusions reached above, the preferred operating conditions are running the oxy-fuel flame fuel-rich and the air-fuel flame approximately at stoichiometric conditions rather than the reverse. Using conditions reverse to the invention would only marginally reduce the flame temperature of the air-fuel flame and drastically increase the flame temperature of the oxy-fuel flame. In view of the fact that thermal NOx production in flames increases exponentially with temperature, the high peak flame temperatures that would result in the reverse practice of the invention would produce higher NOx than the invention. Although running both burners fuel-rich would reduce NOx, the thermal efficiency would suffer. Since oxygen enrichment has been proven to increase thermal efficiency, the present invention would enhance productivity even though the oxy-fuel flame is fuel rich because the reduction from being fuel-rich is far outweighed by oxygen enrichment. In most industrial furnaces, unburned hydrocarbon emissions will not be present due to air infiltration into the furnace and into the exhaust system which combusts any remaining fuel in the exhaust gases leaving the flame zone.

The present invention can be easily retrofitted to existing systems at minimal cost. The present invention gives an incremental increase in productivity without the penalty of high NOx emissions which normally occur at low levels of oxygen enrichment. Oxy-fuel burners have previously been added to air-fuel furnaces to increase productivity, however, prior to the present discovery NOx emissions were not considered to be a problem.

Having thus described our invention what is desired to be secured by Letters Patent of the United States is set forth in the appended claims.

We claim:

1. A method of reducing nitrogen oxide levels produced during the combustion of an air-fuel mixture comprising the steps of:
   (a) combusting an oxy-fuel mixture inside an envelope of air-fuel combustion to shield the oxy-fuel combustion from nitrogen during combustion;
   (b) maintaining the oxy-fuel mixture in a fuel rich condition during the entire combustion process; and
   (c) maintaining combustion of the air-fuel mixture at conditions dictated by stoichiometry or slightly fuel-lean.

2. A method according to claim 1 wherein the process is operated so that the oxy-fuel combustion provides between 50 and 90% of the total heat generated by the combustion process.

3. A method according to claim 1 wherein the stoichiometric conditions in the oxy-fuel combustion is maintained at an equivalence ratio between 1.2 and 1.35.

4. A method according to claim 1 wherein said oxy-fuel combustion takes place concentrically inside of the air-fuel combustion.

5. A method according to claim 1 wherein the fuel in the oxy-fuel burner is selected from the group consisting of methane, propane, fuel oil, waste oil, hydrocarbon fuels and mixtures thereof.

6. A method according to claim 5 wherein the ratio of oxygen to fuel is 1.5 part oxygen to 1 part methane.

7. A method according to claim 1 wherein the fuel for both the air-fuel and oxy-fuel combustion is selected from the group consisting of methane, propane, fuel oil, waste oil, hydrocarbon fuels and mixtures thereof.

8. A method according to claim 1 wherein the fuel for the air-fuel combustion is oil and the fuel for the oxy-fuel combustion is methane.

9. A method according to claim 1 wherein said process is carried out by inserting an oxy-fuel burner concentrically within an air-fuel burner.

10. A method according to claim 1 wherein said process is carried out by inserting an oxy-fuel burner in the process apparatus in a manner to inject oxy-fuel combustion products into the air-fuel combustion.

* * * * *